United States Patent [19]

Grüniger et al.

[11] 3,778,005

[45] Dec. 11, 1973

[54] MECHANISM FOR HANDLING MAGNETIC TAPES

[75] Inventors: Fritz Grüniger, Stockheim; Günther Müller, Wilhelmsthal; Klaus Steiger, Kronach, all of Germany

[73] Assignee: Loewe-Opta GmbH, Berlin, Germany

[22] Filed: Jan. 5, 1972

[21] Appl. No.: 215,609

[30] Foreign Application Priority Data

| | | |
|---|---|---|
| Jan. 7, 1970 | Germany | G 71 00 448.3 |
| Jan. 7, 1970 | Germany | G 71 00 449.4 |
| Jan. 7, 1970 | Germany | G 71 00 447.2 |

[52] U.S. Cl. .............................. 242/186, 242/75.51

[51] Int. Cl. ... B65h 59/00, G03b 1/04, G11b 15/32

[58] Field of Search ......242/186–191, 75.44–75.51, 224/67.4, 67.5

[56] References Cited

UNITED STATES PATENTS

| | | | |
|---|---|---|---|
| 2,969,200 | 1/1961 | Selsted | 242/189 |
| 2,094,581 | 10/1937 | Bundick et al | 242/189 |
| 2,855,160 | 10/1958 | Fundingsland | 242/189 |

*Primary Examiner*—Leonard D. Christian
*Attorney*—Arthur O. Klein

[57] ABSTRACT

Mechanism for selectively pulling the tape of a tape recorder forwardly or retarding the tape as required to maintain the tape under constant tension. A means for scanning tape tension controls the air gap of a magnetic eddy current coupling interposed between a constant speed driving means and an eddy current disc drivingly connected to a tape spool.

14 Claims, 7 Drawing Figures

MECHANISM FOR HANDLING MAGNETIC TAPES

This invention relates to a driving and/or braking mechanism for a magnetic tape recorder provided with means for driving the tape magazine, the tape being driven or braked depending upon the direction of travel of the tape. The mechanism includes means for monitoring or scanning the tension of the tape and, by means of such scanning means, regulating the driving or braking moments applied to the tape magazine to secure a constant pull upon the tape. The driving end or braking mechanism has one or two actuating shafts for the magazine cooperating with disc-shaped electromagnetic eddy current drivers forming variably driving rotating magnetic arrangements which are controlled by the tape scanner.

In order to obtain good synchronization in magnetic tape recorders, the tape pull has to be kept constant by means of mechanisms whqch compensate for the differences in torque between the full and empty winding spools; such differences in torque may vary in a relative range of about 1:3. It is known to scan as by a scanning lever the tension of a tape being pulled off a supply spool or magazine, and controlling the braking moment of rotation to which the unwinding spool is subjected in accordance with the response of the scanning lever and thereby changing the pull to which the tape is subjected so as to maintain it under almost constant tension. In such tape recorder a frictional force which is adjustable proportionally to the pull exerted on the tape is applied by a braking arrangement to a turning disc on the unwinding spool.

A similar device, also, for example, controlled by a scanning lever, changes the winding moment of rotation of the winding magazine in such manner that, considering the braking moment of rotation applied to the supply magazine, the pull upon the tape remains constant. Furthermore, it is known in the quick winding or unwinding of the tape to apply a weaker pull upon the tape on the unwinding side and a stronger pull to the tape on the winding side by means which intervenes into the control mechanism of the tape recorder. In such recorder there are provided additional brakes controlled by a scanning lever, the device being provided with constant torque magazine drive. The brakes are either of the type that have a mechanical coupling, preferably by friction, or the type that has electromagnetic or eddy current coupling.

On the other hand, it has also been proposed to provide means to produce a constant basic pull upon the tape in magnetic recorders for tape-shaped magnetograph carriers. In such recorders it is known to provide a disc-shaped eddy current driver on the shaft of a guiding roller which engages the tape in its travel through the tape recorder. The eddy current driver is arranged in a known manner between two ring-shaped oxide magnets on which sectors of the same size are almost the same size are magnetized alternately opposing each other diagonal to the direction of movement of the driver. One of these ring-shaped magnets is physically arranged and the other is arranged to be turnable through a maximum range of one pole division. The turnable magnet is connected with one or several operating buttons so that when one pushbutton is pushed the turnable magnet is set into an operating position and when such button is released, the turnable magnet returns to its resting position. A considerable disadvantage of this arrangement is that a continuous regulation of the driving torque is not guaranteed as a function of the pull actually applied to the tape.

The invention has among its objects the provision of a mechanism for a magnetic tape recorder such that mechanical wear is reduced, the actual drive is mechanically separated from the magazine, and the winding side as well as the unwinding side are controlled by means of a corresponding drive and braking torque respectively so that the tape is maintained under constant tension. In accordance with the invention a quick tape drive in both directions is made possible during the rewinding of the tape; this is accomplished by being able to adapt the drive and braking torque of the magazine in an especially simple manner by means of a mutual adjusting element applied to the desired operating function.

In accordance with the invention the rotating, ring-shaped multiple pole permanent magnet drives or brakes, respectively, a disc-shaped eddy current driver by means of a following, further ring-magnet and/or a following soft iron disc by means of eddy current coupling by the formation of a magnetic field through an air gap. The eddy current coupling is made dependent on the tension of the tape by means of a scanning device, e.g., a scanning lever, which is preferably biased by a spring. The scanning lever displaces the eddy current drive and the magnet arrangement in opposite radial or vertical directions, and/or discs which are interposed in the air gap. All of these means control the magnetic field and operate together with the scanning device so that the drive or the braking torque which is applied to the eddy current drivers guarantees a constant or almost constant tension upon the tape.

Basically, an adjustable driving moment of rotation or an adjustable braking moment of rotation, as the case may be, is applied to the eddy current driver by means of adjusting the distance of engagement or spacing of the eddy current driver in the magnet arrangement, and by adjusting the magnet sector lines of the rotating magnet arrangement in accordance with the corresponding moment of rotation of the magnet arrangement. The depth of insertion of the eddy current driver into the air gap of the magnet arrangement is varied by the scanning lever, which swings in an amount which is proportional to the tension imposed upon the tape. Thus the moment of rotation to which the magazine is subjected by means of the eddy current driver is always automatically correlated to the tension upon the tape.

A number of different embodiments of mechanisms for regulating the drive or the braking moment of rotation in accordance with the invention are disclosed herein. In a first arrangement or embodiment the eddy current driver is adjustable in a radial direction with respect to the permanent magnet arrangement. In a different embodiment, the rotating magnet arrangement is adjustable in a radial direction with respect to a permanently positioned eddy current driver. Furthermore, in accordance with the invention the drive or braking moments of rotation to which the eddy current driver is subjected by axial displacements of the magnet arrangement or parts of it take place in directions opposite of the eddy current driver, or the eddy current driver is displaced in directions opposite the magnet arrangement, in those embodiments wherein the shaft of the eddy current driver as well as the shaft of the rotating magnet arrangement are arranged on fixed axes in the tape recorder.

In a further embodiment of the mechanism in accordance with the invention for regulating the drive or braking moment of rotation, the scanning lever is connected to and controls a swinging movable soft iron disc which variably interferes in the eddy current coupling between the eddy current driver and the rotating magnet arrangement, whereby due to the change of the magnet sector lines the moment of rotation of the driver or brake is changed to such a degree that the tension of the tape remains constant.

In a further embodiment there is provided in the embodiment described immediately above, which is provided with a shield which consists of soft iron material or with a correspondingly formed soft iron cover, the comparison force of the spring which is connected to the scanning device and is operated by tape tension, is adjustable by means of a lever or by changing the attachment of the spring suspension.

It will be apparent that, in accordance with the invention, the eddy current coupling is applicable for the driving of a magazine on the winding side as well as for the braking of a magazine on the winding side. The driving means and the braking means are preferably mirror images of each other and operate in opposite directions. In such arrangement it is provided that on rewind or on quick unwind there is provided a stronger tape tension or a greater moment of rotation of the disc, these being attained by changing the moment of rotation of the magnet arrangement, whereas on the winding side the tape regulation remains unchanged or the scanning lever can be constantly adjusted to a smaller amount of rotation for a changing of the point of rotation. This is possible in accordance with the above-described four basic examples, because the eddy current coupling which is formed between the eddy current driver and the rotating magnet arrangement, by opposing and/or one-sided radial and/or axial shifting of the eddy current driver and/or the magnet arrangement can be adjusted in a practical example, the invention provides that when there is an axial shifting of the eddy current driver or of the magnet arrangement, the magnet arrangement which affects the drive or the braking of the unwinding of the tape is disposed on a common axle with the eddy current driver. for this purpose, the rotatable shaft of the magazine has to be equipped with an additional pivot bearing for the magnet arrangement, whereby the ring-shaped magnet or soft iron disc which effects the interference and that is a part of the magnet arrangement has to be provided on both sides of the eddy current driver.

When, in accordance with the invention, the eddy current discs and the rotating magnet arrangements are disposed on different shafts, the axes of such shafts may be swung relative to each other in an amount proportional to the changing tension whereby to alter the torque applied by the eddy current coupling so as to maintain the tape tension constant. In one embodiment disclosed herein the tension scanning lever has a ramp-like cam thereon, the magazine or spool is mounted upon one or more levers journalled on an axis spaced from the axis of the spool, and a cam following roller is journalled on such spool-mounting lever intermediate the length of such lever. The rotating magnet arrangement is disposed on a fixed axis; the cam following roller is constantly urged against the cam by resilient means such as a spring.

In a magnetic tape recorder which has an eddy current coupling arrangement for both spools or magazines, and wherein the two rotating magnet arrangements respectively subject one of the spools to a driving, tape-winding moment of rotation and subject the other spool to a tape-braking moment of rotation, the invention provides the following: when on quick rewind both rotating magnet arrangements, that is, the one on the winding as well as that on the unwinding side are shiftable or adjustable in such a manner by means of a mutual adjusting lever, so that changes in the air gap provide a larger driving moment on the winding side and a smaller driving moment on the unwinding side, there is no necessity for tape tension regulation per se. In such embodiment, the two rotating magnet arrangements are permanently arranged on a swinging element or support which, by means of a pushbutton or a lever, can be swung in a selected direction so that the depth of overlap of the eddy current driver on the drive side with respect to the magnet arrangement is considerably larger than the depth of engagement of the eddy current driver on the unwinding side, the latter eddy current driver exercising the function of braking the supply or unwinding spool. In order to be still able to regulate the drive or the braking moment of rotation in dependence upon the tape tension, in a further example the invention provides that the swinging member can be indirectly actuated by means of a pushbutton or lever through the intermediary of a spring, whereby the swinging member itself becomes freely movable with respect to the lever through an appreciable range, so that it can be swung in response to movement of the scanning lever as the lever varies with variation in tape tension, whereby the tape tension remains constant.

In order to simplify the drive system, the invention provides that the two rotating magnet arrangements are driven by a motor together with a step disc for the tape roll drive by means of a belt. It is clear that as a result the belt has to be driven in such manner by way of guiding rollers and has to drive the magnet arrangements such that their rotational movements are opposite to each other. Hereby it is furthermore provided that the changes in the belt tension are balanced by a spring that is connected to the swing member which amounts the rotating magnet arrangements, and/or that a wire-shaped return spring holds the actuating lever which is affixed to the swinging member in its middle position.

The invention will be explained in detail by means of several embodiments, and with the aid of the drawings, in which.

Figures 3, 4, 5, 6:
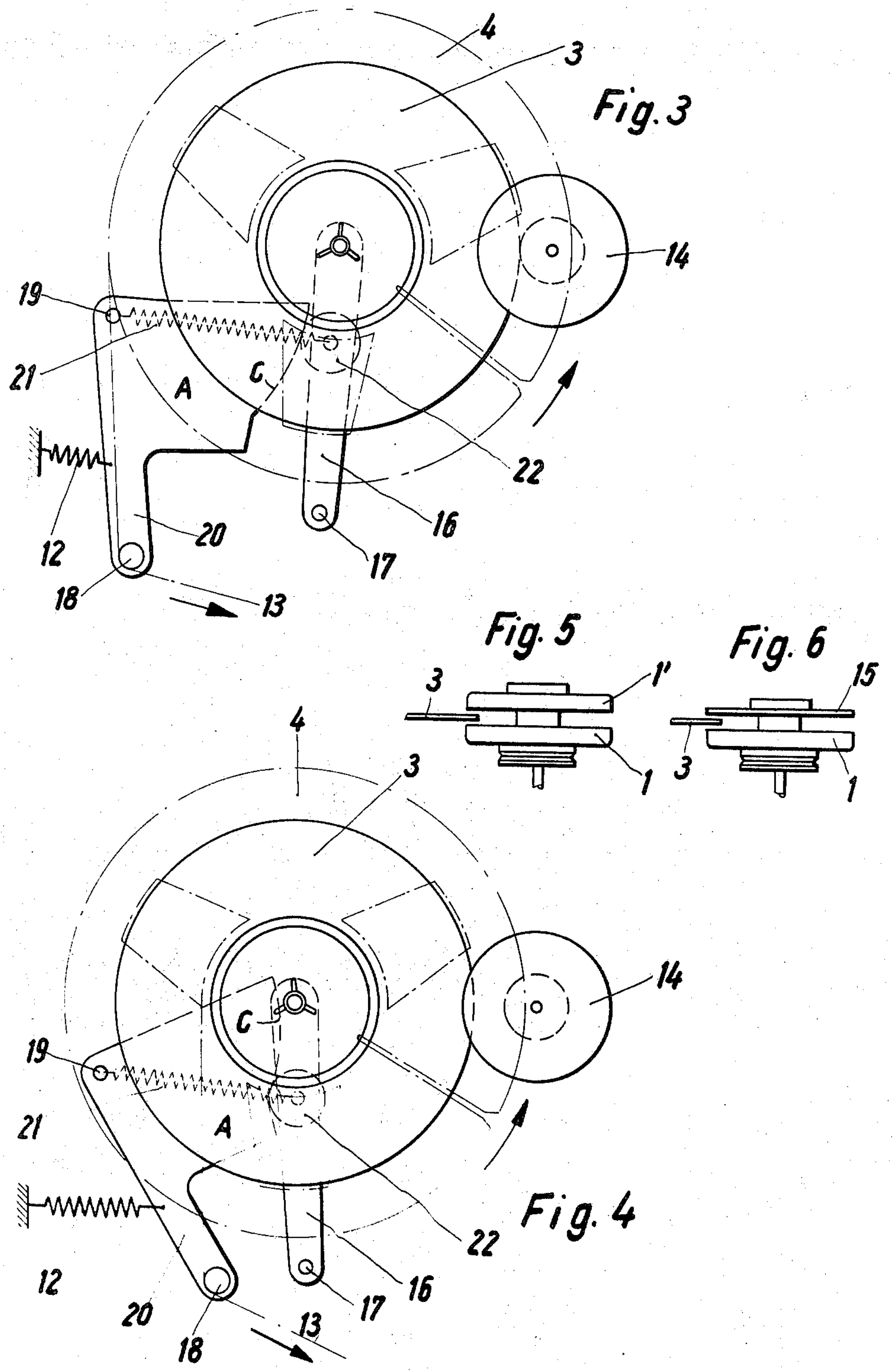
Figure 7:
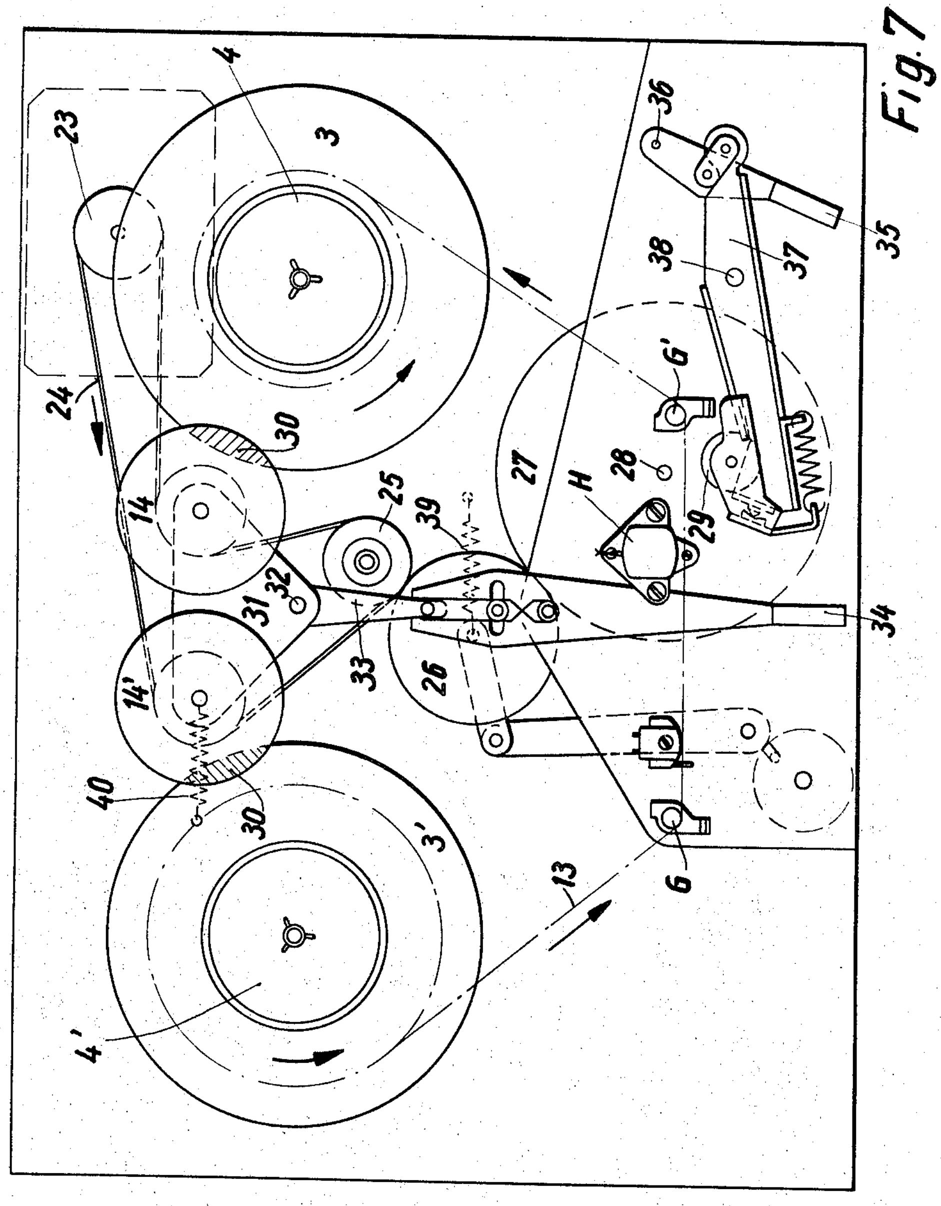

FIG. 3 is a somewhat schematic view in plan of a second embodiment of eddy current coupling with drive and tape tension regulation on the unwinding side, the supply spool or magazine being shown fully wound, the eddy current driver, which is located on the axis of the magazine, being adjustable in a direction radially toward and away from a rotating magnet which is mounted for rotation about a fixed axis;

FIG. 4 is a view similar to FIG. 3 but with the parts in the positions which they assume when the supply magazine for the magnetic tape is nearly unwound;

FIG. 5 is a view in side elevation showing a driven ring-shaped permanent magnet in which the air gap is formed by a second magnet ring, the two rings being shifted together;

FIG. 6 is a view in elevation of a driven ring-shaped permanent magnet in which the air gap is formed between the magnet and a coaxially mounted soft iron disc; and FIG. 7 is a somewhat schematic view in plan of a further embodiment of magnetic tape recorder in accordance with the invention, there being a mutual drive of the two magazines by means of eddy current coupling, the rotating magnet arrangements being permanently journalled on an adjustable swing member, each of the rotating magnet arrangments being disposed to cooperate with an eddy current driver mounted coaxially of the axle of the respective magazine.

Figure 1:
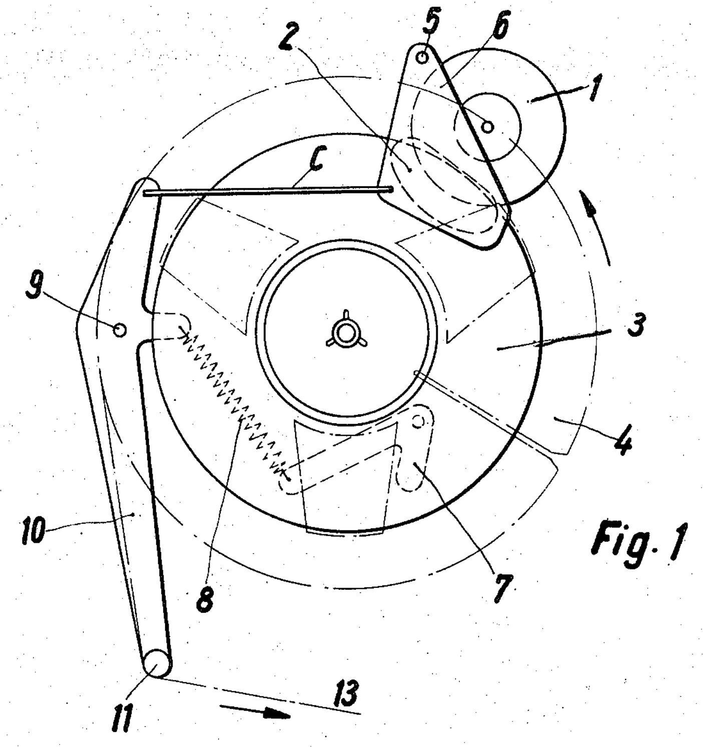
FIG. 1 is a somewhat schematic view in plan of an eddy current coupling in accordance with the invention, such coupling being shown associated with a supply or pay-off magazine or spool 4 for a magnetic tape of a tape recorder, the spool being shown in substantially full condition.

In FIG. 1 there is shown a magnet ring 1 in the form of a permanet magnet having a plurality of poles of alternating polarity. The magnet ring 1 is fixedly mounted upon a shaft which is driven at constant speed by a prime mover, not shown. An eddy current disc 3 made out of highly electrically conductive metal is firmly connected to a winding spool 4 for the magnetic tape by means of a receiver pin; the disc 3 partly covers the magnet ring 1 as shown. Mounted outwardly of the eddy current disc 3 and partially covering it there is a movable shield 6 which is pivotally mounted upon a povit pin 5. The shield 6 is provided with a soft iron cover 2 which is disposed in the magnetic circuit which couples the magnet ring 1 and the eddy current disc 3. Adjustment of the shield 6 with the soft iron cover 2 thereon results in a change of the coupling between the magnet ring and the disc and thus the driving torque to which the disc 3 is subjected. The magnetic tape 13 is led from the spool or magazine 4 around a guiding bolt or stud 11 on the end of a scanning lever 10, lever 10 being pivotally mounted upon a pivot pin 9. It will be seen that when the tension in the magnetic tape increases, it tends to turn the scanning lever 10 counterclockwise. This tendency to turn the lever 10 is opposed by a coil tension spring 8 which is attached to the lever 10 eccentrically of the pivot pin 9 and to the right thereof as shown in FIG. 1, and to an arm of an adjusting lever 7 whereby the tension of the spring 8 may be adjusted as required. A link L is pivotally connected to the upper end of the lever 10 and to the shield 6 eccentrically of the pivot pin 5 therefor. It will be seen that an increase in the tension of the magnetic tape 13 causes the shield 6 to be rotated clockwise about its pivot point, thereby pulling the shield with its soft iron cover piece 2 away from the magnet ring 1 thereby reducing the degree of magnetic coupling between the magnetic ring 1 and the eddy current disc 3. The driving torque to which the disc 3 is subjected is thus reduced until the tension of the magnetic tape again reaches the desired predetermined value. By adjusting the setting lever 7 it is possible to change the effective force of spring 8 and thus the value of the tape tension which is to be kept constant.

When the delivery spool 4 is full, as shown in FIG. 1, the magnetic tape 13 is pulled off the spool at its maximum diameter, the spool and its mounting thus presenting the minimum retardation upon the tape 13. Consequently, under such conditions the retardation imposed upon the spool 4 by the magnet ring 1 and the current eddy disc 3 is at a maximum. As the effective diameter of the spool decreases during the unwinding of the spool, the retardation imposed upon the magnetic tape by the spool increases; consequently, the added retardation of the spool effected by the magnetic coupling between the members 1 and 3 must necessarily decrease if the tension of the magnetic tape is to remain constant. Such decreasing of the added retardation is automatically effected by the scanning lever 10, the link L, and the swinging shield 6 with its soft iron cover 2.

Figure 2:
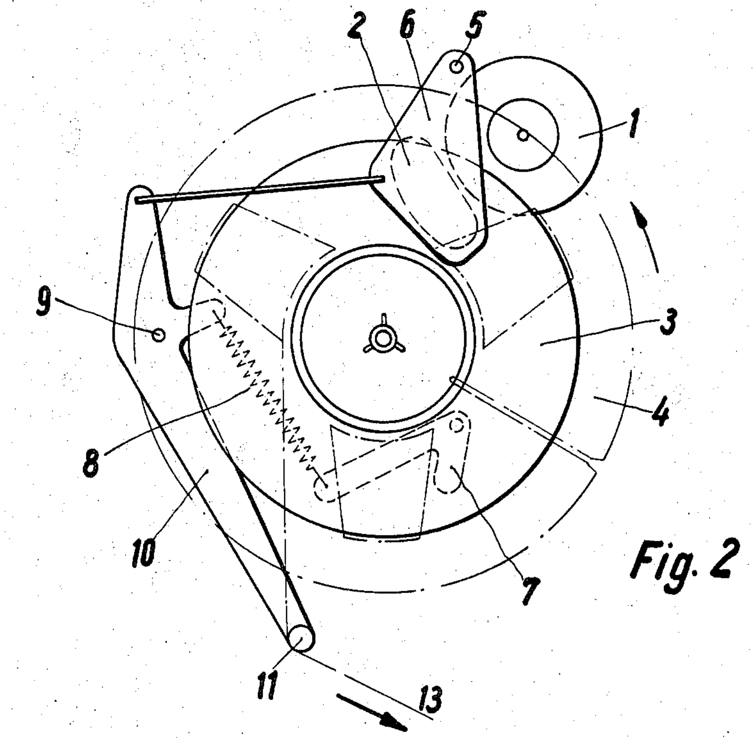
FIG. 2 is a view similar to FIG. 1 but with the parts in the positions they assume when the supply spool is empty.

FIG. 2 shows the final position of the parts which they assume when the supply spool or magazine 4 is empty. Now the magnetic tape has pulled the tape guiding member 11 to the right and has thus rotated the scanning lever 11 counterclockwise. This has caused the shield 6 with its soft iron cover 2 to be pulled entirely away from the ring magnet 1, and thus the braking drive moment of rotation exerted upon the eddy current disc 3 has been reduced to a minimum, since the tension imposed upon such tape by the reel 4 and its mounting means is at a maximum.

On the tape-winding side of the tape recorder there is employed an eddy current coupling which is identical with that above-described with the difference, however, that such coupling devices the take-up reel rather than retards it. On the winding side of the recorder, the ring magnet is coupled to the eddy current disc 3 which is fast to the magazine 4 in such manner that the drive moment of rotation when winding the magnetic tape is controlled by a scanning lever 10 so that the driving torque thus imposed upon the take-up spool 4 increases as the effective diameter of the spool increases, thereby maintaining the tension of the cord on the take-up or winding side of the recorder constant.

It is desirable for rewinding the tape, that is to say, for example, for a quick unwind, that the driving moment of rotation on the winding side be increased. The recorder of the present invention provides for this operation by changing the setting of the spring tensioning lever 7 so that the spring force of the spring 8 is changed in such a way that the shield 6 is then caused to overlie the air gap between the magnet arrangement 1 and the eddy current disc 3, thereby to increase the driving moment of rotaton exerted upon the rewinding or supply spool. In such mode of operation tape-tension regulation goes on as before, but with the spring 8 biasing the scanning lever 10 to a different degree, as dictated by the setting of the lever 7.

As there are no jerks when switching over from a quick winding or unwinding, the magnetic tape is carefully handled due to the eddy current coupling between the elements 1 and 3. The braking of the magazine is also relatively gentle, as the two couplings, that is, the one on the winding side and the one on the unwinding side, then counteract each other, and only additional, relatively weak brakes are necessary for the quick-braking of the tape. A further advantage of the described mechanism is that the positions of the shaft bearing the magazine or spool and the rotating magnet arrangement are permanetly fixed in the case of the device. Thus, only the rotating parts and the bearings mounting the scanning lever and the shield undergo any frictional wear.

In FIGS. 3–5, inclusive, there is shown a further embodiment of the mechanism of the invention, in such embodiment control of magnetic tape tension being effected by adjustment of the eddy current disc, which is affixed to the magazine or spool coaxial thereof, toward and away from the rotating magnet arrangment which is mounted upon a fixed axis. In FIG. 3, the magnet arrangement, there designated 14, is assumed to be constructed in the manner shown in FIG. 5, although as will appear below the construction of FIG. 6 may be substituted therefor. The magnet arrangement 14 is driven at a constant speed by a prime mover (not shown). As shown in FIG. 5, the magnetic arrangement 14 includes a lower, ring-shaped permanent magnet 1 which is provided with multiple poles which alternate in polarity in a direction circumferentially of the disc 1. Magnet 1 is affixed to the constantly-driven shaft, as is a second permanent magnet 1' likewise affixed to such shaft with an air gap therebetween. The permanent magnet 1' has a plurality of poles spaced circumferentially thereof, the poles being of alternating polarity, the poles on magnet 1' being staggered angularly with respect to those on magnet 1, so that the poles on magnet 1' lie centrally between the poles on magnet 1. The outer edge of the eddy current disc 3 is disposed within the air gap between permanent magnets 1 and 1', in the position of the parts shown in FIG. 3 the discs 3 penetrating deeply into such air gap, and in the position of the parts shown in FIG. 4 the disc 3 being disposed between only the outer edges of the magnets 1 and 1'. The manner of shifting of the disc 3 between the positions of FIGS. 3 and 4 will be explained below.

In the embodiment of eddy current coupling device shown in FIG. 6, the upper permanent magnet 1' of FIG. 5 is replaced by a soft iron disc 15 which is affixed to the permanent magnet 1 and to the shaft which mounts such elements 1, 15. An air gap is presented between such elements, as shown. The outer edge of the eddy current disc 3 extends into such air gap, as shown in FIG. 6. As in the embodiment of FIG. 5, the torque exerted upon the disc 3 by the rotatable magnet arrangement varies in accordance with the degree of penetration of the disc 3 into the air gap of the magnet arrangement, the torque being at a maximum when the disc penetrates most deeply into the gap (FIG. 3), and at a minimum when there is only a slight overlap between the magnet arrangement and the disc 3 (FIG. 4). The eddy current driver disc 3 is made of non-magnetic metal of good electrical conductivity, such as copper.

The apparatus shown regulates the tension of the tape 13 as such tape is unwound from the spool 4; in its travel the tape passes over the guiding stud 18 on the end of the scanning lever 20. It will be seen that the tension in the tape tends to rotate the lever 20 counterclockwise about its pivot point 19; such tendency is opposed by the coil tension spring 12 which is affixed to a part of the frame of the machine at one end and to the lever 20 at the other so as constantly to urge the lever 20 clockwise about the pivot point 19. The eddy current disc 3 and the spool or magazine 4 are journalled upon one or more levers 16 at one end thereof, the other end of such levers being journalled upon a fixed pivot 17. Intermediate their length the levers 16 carry a cam follower roll 22 which is constantly held in engagement with the cam C by a coil tension spring 21 affixed to the levers 16 and to the fixed pivot 19. In the condition of the parts shown in FIG. 3, wherein the magnetic tape 13 is being pulled off a full spool 4, the tension in the tape 13 caused by the pulling thereof from the spool is low so that the lever A lies adjacent its clockwise terminal position, the levers 16, the disc 3 and the spool 4 are swung to the right, near the overlap between the magnet arrangement 14 and the disc 3 is a maximum; in such position of the parts, the tape 13 is subjected to the desired predetermined tension.

As the tape 13 is unwound from the spool 4, the degree of overalp between the magnet arrangement 14 and the disc 3 progressively decreases. In FIG. 4, wherein the tape is shown being unwound from a nearly depleted spool 4, the tension in the tape 13 will have increased as a result of such change in the diameter of the spool from which it is being wound that the scanning lever 20 now occupies substantially its terminal counterclockwise position. In such position the cam follower roll 22 engages the lower portion of the cam C, thereby swinging the levers 16, the disc 3 and the spool 4, so that there is now a minimum overlap between the magnet arrangement 14 and the disc 3. In such condition, the magnet arrangement and disc cooperate to subject the spool 4 to a minimum braking moment of rotation, whereby the tape 13 remains subjected to said substantially constant predetermined desired tension.

On the winding side of the recorder (not shown) the same eddy current coupling as that shown in FIGS. 3 and 4 is employed for the drive of the spool, the parts being reversed, however, to the extent that the coupling exerts a maximum torque upon the eddy current disc when the winding spool is substantially full, and exerts thereon a minimum torque when the winding spool is substantially empty. In other words, the progressively changing degree of overlap between the magnet arrangement 14 and the eddy current disc 3 caused by a scanning lever such as lever 20 is such that the winding tension of the magnetic tape is held substantially constant over the entire winding range.

For the rewinding of the tape, that is to say, for example, for a quick unwind, an increased as well as a regulated tension upon the tape or the largest required driving moment of rotation, corresponding to the condition shown in FIG. 3, can be obtained by increasing the force exerted by the spring 12 upon the scanning lever on the winding side of the recorder. With such construction, the magnetic tape tension on the unwinding side can also remain regulated, or it can be set to the lowest tape tension corresponding to FIG. 3 but with reversed or mirror image conditions of the degree of fullness of the spool. Since in such construction there are no jerks when switching from quick winding or unwinding, the tape is very carefully handled by the driving or braking of the spool by the eddy current coupling. During the braking of the spool, the braking and winding couplings act counter to each other, and thus only weak additional brakes are necessary in the system.

In FIG. 7 there is shown a magnetic tape recorder having two magazines or spools 4 and 4', both of such spools being driven or braked, as the case may be, by the same electric motor. Mounted upon the motor shaft is a pulley 23 over which there is entrained a belt 24 which passes around a pulley coaxial of and affixed to a rotatable magnet arrangement 14'. From such magnet arrangement 14' the belt 24 passes downwardly and to the right around a step pulley 25 and thence upwardly and to the left around a pulley mounted coaxial of and affixed to a rotatable magnet 14 from which the belt 24 returns to the driving pulley 23. The rotatable magnet arrangements 14 and 14' cooperate with eddy current discs 3 and 3', respectively, such eddy current discs being mounted coaxial of and affixed to the spools 4 and 4', respectively. The magnet arrangements 14 and 14' are journalled upon a triangular supporting member 31 which is journalled for swinging about a pivot pin 32. In the position of the parts shown in FIG. 7, the element 31 is disposed in a central position, and the magnet arrangements 14 and 14' overlap the respective eddy current discs 3, 3' in equal areas 30, 30'.

It is assumed that the recorder, which in FIG. 7 is shown at its "at rest" position, upon resumption of operation will pay magnetic tape 13 off the spool 4' and wind it upon the spool 4. As shown, the tape 13 passes partially over a guide roll G at the left, past a recording and erasing head H, partially about a second guiding roller G', and thence to the spool 4. In such position the span of the tape 13 between the guide means G, G' is free of contact with the head H and tape-pulling means 28, 29. Tape-pulling roll 28 is mounted coaxially of and affixed to a relatively large rotatable disc 27 which is selectively frictionally driven at different desired speeds from the stepped roll 25 through the intermediate idle roll 26 which has frictional contact with a selected step of the roll 25 and the rim of roll 27. In FIG. 7 the roll 29, which is a rubber-covered roll, is shown retracted from the tape 13 and the driven roll 28. Roll 29 is mounted upon a two-armed lever 37 which is povitally mounted upon a pivot pin 38, as shown. Lever 37 is selectively swung clockwise from the position in FIG. 7 to cause the friction roller 29 forcibly to pinch the tape 13 between it and the driven roll 28. This is effected by swinging the lever 35 to the right about its pivot pin 36, thereby to depress the right-hand end of the lever 37. The stepped wheel 25 may be of such dimensions as to provide settings for different speeds of travel of the tape 13 such as, for example, 2.4; 4.75; 9.5; and 19 cm/sec.

The permanent magnet arrangements 14, 14' include rotatable magnets with circumferentially spaced poles of alternating polarity as described in connection with FIG. 5. Alternatively, permanent magnet arrangements such as that shown and described in connection with FIG. 6 may also be employed. The magnitude of the torque or moement of rotation which the magnet arrangements 14, 14' exert upon the discs 3, 3' depend upon the area of overlap between such members, such areas being designated 30 and 30' respectively, and being shown in dash lines in FIG. 7.

It will be understood that the driving motor is of the constant-speed type, and that a change in the respective values of the areas 30, 30' as required by desired service conditions will change the value of the driving torque applied to the spool 4 as compared to the braking torque applied to the spool 4'. Such changing of the areas 30, 30' is effected by the swinging of the member 31 about its supporting pivot 32. Such swinging movement of member 32 is effected by the swinging of a lever 23, which is fixedly connected to member 31 and is pivotable with it around the pivot pin 32, the lever 23 in turn being pivoted by a setting lever 34 with which it has a tongue-and-fork connection as shown.

When the tape recorder is placed in condition for "reproduction/recording" the setting lever 34 and the member 31 are in the middle positions shown, wherein, as noted, the areas 30, 30' are equal. The lever 35 is then pressed to the right, causing the linkage between such lever and the right-hand end of lever 37 to pass over its dead-center position and thus to advance the rubber-covered roll 29 to pinch the tape between it and the driven roll 28 which pulls the tape to the right. A coil tension spring 39 tends to hold the lever 34 and thus the lever 23 in the member 31 in the central position shown. It will be evident that the transportation of the tape is effected by the driven roll 28 acting together with the pinch roll 29, and that the eddy current magnetic couplings 14, 3 and 14', 3' are relied upon only to control the tension of the magnetic tape 13 in advance of and following the tape transporting rolls 28, 29. It is to be understood, however, that such couplings may, if desired, also be used for transporting of the tape.

When the magnetic tape 13 is to be quickly unwound, the swinging element 31 is swung to the left by swinging the lever 34 to the left. Thus, the area 30' on the left disc 3' is enlarged and the area 30 on the right disc is decreased, thereby to provide on the now winding, left side of the recorder an increased moment of rotation upon the left spool by the magnet arrangement 14', and thus the tape is unwound at an increased speed. On the right side of the recorder that is now unwinding the tape, on the other hand, the area 30 is decreased and thus the counterpull on the tape on the unwinding side is decreased in a desired way for a quick back spooling. During this quick unwinding operation, the lever 35 is set as it is shown in FIG. 7, so that the pressing roll 29 is lifted from the tape 13, and thus the tape 13 is lifted from the roll 28.

For quick winding, that is to say, a rewind in the reverse direction (from left to right) as above described, the lever 34 and thus the swinging element 31 are set to the right so that the area 30 is larger than the area 30', whereby the torque exerted upon the winding spool 4 is larger than that exerted upon the supply spool 4'. The differing tensions upon the driving belt 24 in the two positions: quick unwind or wind, are balanced by a coil tension spring 40 which extends between a fixed support of the recorder and the left-hand upper corner of the member 31, as shown.

From the quick unwind or quick wind positions of the recorder, the tape is very softly braked and brought to a halt by switching the lever 34 back to its middle position in which the drving and braking moments of rotation applied to the respective tape spools by the two magnetic eddy current coupling devices are the same. With the eddy current couplings in accordance with the invention, one can even switch directly from a quick wind to a quick unwind without subjecting the magnetic tape to too much stress. The described tape recorder, provided with eddy current couplings in accordance with the invention, is independent of its position, that is, when the spools are properly affixed to their mounting and driving shafts, that is to say, the recorder can be used whether positioned horizontally or vertically.

Also, in the described embodiment of FIG. 7, the drive moment and the braking moment of rotation can be regulated in accordance with the tension of the tape. With such construction, which is not shown herein, the lever 33 and the member 31 are connected by a spring which permits limited movement of one of such members with respect to the other while retaining the function of switching over the member 31 by the swinging of the lever 33. Member 31, however, has sufficient freedom of motion with respect to lever 33 that the member 31 may be governed by a tension scanning lever in accordance with the embodiments of the invention shown in FIGS. 1–4, inclusive, and described above.

It is to be understood that the described invention is not limited to the embodiments shown. It is not necessary that the eddy current driver or eddy curent brake be arranged on the same axis as the respective magazine or spool, it being required only that the eddy current driver brake be drivingly connected with the respective spool. One practical example of such changed construction within the scope of the invention is to provide for the driving of magnetic tape-engaging pinch rollers, such as the rollers 28 and 29 of FIG. 7, by or through magnetic eddy current couplings rather than frictionally as shown in FIG. 7.

Although the invention is illustrated and described with reference to a plurality of preferred embodiments, it is to be expressly understood that it is in no way limited to the disclosure of such a preferred set of embodiments, but is capable of numerous modifications within the scope of the appended claims.

What is claimed is:

1. Mechanism for imposing torque upon a tape-containing spool of a magnetic tape-handling apparatus, comprising a constant-speed driving means, a variable magnetic eddy current coupling drivingly connected between the driving means and the spool, tape tension responsive means for scanning the tension in the tape in the span thereof extending to the spool, and means connecting the scanning means to the coupling to vary the coupling in accordance with changes in the tension of the tape, the coupling comprising a driven rotatable multiple pole magnet mounted on a first axis and an eddy current disc mounted on a second axis spaced from the first axis and parallel thereto, disposed to be acted upon by the magnetic field of the magnet, a magnetic field-influencing member made of ferromagnetic material, means mounting the field-influencing member for movement relative to the magnet and disc so as to vary the magnetic field acting between the magnet and disc, means connecting the field-influencing member for movement relative to the magnet and disc, and means connecting the field-influencing member to the tape tension scanning member so as to be moved thereby to maintain the tension of the tape substantially constant.

2. Mechanism according to claim 1, wherein the field-influencing member in at least one operative position thereof at least partially overlaps the magnet and the eddy current disc and is mounted for movement in a plane at least generally parallel to the planes of rotation of the magnet and the eddy current disc.

3. Mechanism according to claim 1, comprising means pivotally mounting the field-influencing member for oscillation about an axis spaced from and parallel to the first and second axes.

4. Mechanism according to claim 1, wherein the tension scanning means includes a lever, and comprising a spring opposing movement of the lever by increased tension in the tape.

5. Mechanism according to claim 4, comprising means for adjusting the force which the spring exerts upon the lever.

6. Mechanism according to claim 1, wherein the rotatable magnet and the eddy current disc are adjustable relative to each other radially thereof whereby to vary the magnetic field between them.

7. Mechanism according to claim 6, wherein the magnet is mounted on a fixed axis and the spool is mounted for adjustment radially of the magnet, the tension scanning means is a lever carrying a ramp-like cam, and comprising a cam-following roller mounting to move laterally with the spool, and means constantly urging the cam-following roller against the cam, the cam being of such configuration as to vary the magnetic field between the magnet and the eddy current disc so as to subject the spool to a torque which varies to compensate for changes in tension in the tape.

8. Mechanism according to claim 1, comprising two spools between which the magnetic tape is selectively reversed, and a magnetic coupling interposed between the driving means and the respective spools.

9. Mechanism according to claim 8, comprising a recording head past which the tape is pulled, pinch roll means for pulling the tape past such head, and a drive belt drivingly connected with the driving means and the two magnetic couplings, and at least one roll of the pinch roll set.

10. Mechanism according to claim 9, wherein the magnetic couplings each comprise rotating driven magnet and an eddy current disc cooperating therewith, a pivotally mounted member upon which the rotating magnets are disposed so that swinging of the pivotally mounted member changes the degree of overlap between the rotating magnets and the eddy current discs of the respective magnetic couplings in opposite directions.

11. Mechanism according to claim 10, comprising an actuating lever for the swinging member mounting the magnets, and a spring biasing the actuating lever toward its middle position.

12. Mechanism according to claim 10, provided with means for quickly rewinding the tape, the rotating magnet arrangements on the winding and unwinding side of the apparatus providing an increased drive moment on the winding side when thus rewinding and a decreased braking moment on the unwinding side.

13. Mechanism according to claim 8, comprising means for rewinding the tape and means for quickly unwinding the tape, the mechanism being so constructed and arranged that the torque imposed upon the winding spool by its magnetic coupling is increased whereas the torque imposed upon the unwinding spool remains unchanged.

14. Mechanism for imposing torque upon a tape-containing spool of a magnetic tape-handling apparatus, comprising a constant-speed driving means, a variable magnetic eddy current coupling drivingly connected between the driving means and the spool, tape tension responsive means for scanning the tension in the tape in the span thereof extending to the spool, and means connecting the scanning means to the coupling to vary the coupling in accordance with changes in the tension of the tape, the rotatable magnet and the eddy current disc being adjustable relative to each other radially thereof whereby to vary the magnetic field between them, the magnet being mounted on a fixed axia and the spool being mounted for adjustment radially of the magnet, the tension scanning means being a lever carrying a ramp-like cam, a cam-following roller mounted to move laterally with the spool, and means constantly urging the cam-following roller against the cam, the cam being of such configuration as to vary the magnetic field between the magnet and the eddy current disc so as to subject the spool to a torque which varies to compensate for changes in tension in the tape.

* * * * *